US009850358B2

(12) United States Patent
Tebbe et al.

(10) Patent No.: US 9,850,358 B2
(45) Date of Patent: Dec. 26, 2017

(54) LOW-SCORCH FLAME-RETARDANT POLYURETHANE FOAMS

(71) Applicant: LANXESS Deutschland GmbH, Cologne (DE)

(72) Inventors: Heiko Tebbe, Dormagen (DE); Jan-Gerd Hansel, Bergisch Gladbach (DE)

(73) Assignee: LANXESS Deutschland GmbH, Cologne (DE)

( * ) Notice: Subject to any disclaimer, the term of this patent is extended or adjusted under 35 U.S.C. 154(b) by 4 days.

(21) Appl. No.: 14/813,217

(22) Filed: Jul. 30, 2015

(65) Prior Publication Data
US 2016/0046778 A1    Feb. 18, 2016

(30) Foreign Application Priority Data
Aug. 15, 2014  (EP) .................................... 14181117

(51) Int. Cl.
*C08J 9/00* (2006.01)
*C09K 21/12* (2006.01)
*C08K 5/5313* (2006.01)

(52) U.S. Cl.
CPC ........... *C08J 9/0038* (2013.01); *C08K 5/5313* (2013.01); *C09K 21/12* (2013.01); *C08J 2203/10* (2013.01); *C08J 2205/06* (2013.01); *C08J 2375/06* (2013.01); *C08J 2375/08* (2013.01)

(58) Field of Classification Search
CPC .. C08J 9/0038; C08J 2203/10; C08J 2205/06; C08J 2375/06; C08J 2375/08; C08K 5/5313; C09K 21/12; C08L 75/04
See application file for complete search history.

(56) References Cited

U.S. PATENT DOCUMENTS

| 2,764,565 A | 9/1956 | Hoppe et al. |
| 3,580,890 A | 5/1971 | Diehr et al. |
| 3,620,986 A | 11/1971 | Diehr et al. |
| 3,887,483 A | 6/1975 | Morehouse |
| 4,110,276 A * | 8/1978 | DesMarais ............ A61L 15/425 521/123 |
| 4,127,590 A * | 11/1978 | Endo ................. C07F 9/657172 528/167 |
| 4,131,660 A | 12/1978 | Jacobs |
| 4,248,930 A | 2/1981 | Haas et al. |
| 4,263,408 A | 4/1981 | Meyborg et al. |
| 4,281,097 A * | 7/1981 | Albright ................. C07F 9/091 521/168 |
| 4,777,189 A | 10/1988 | Shimomura et al. |
| 2005/0159500 A1 | 7/2005 | Dreier et al. |
| 2014/0128489 A1* | 5/2014 | Eberstaller ............ C07C 279/02 521/85 |
| 2014/0183403 A1* | 7/2014 | Peterson .................. C09K 5/14 252/75 |
| 2014/0343183 A1* | 11/2014 | Gaan ................. C07F 9/657181 521/170 |

FOREIGN PATENT DOCUMENTS

| DE | 2646218 | * | 4/1977 |
| DE | 102007028593 A1 | | 12/2008 |
| EP | 03087333 B1 | | 1/1992 |
| GB | 1162517 | | 8/1969 |
| GB | 1211405 | | 11/1970 |

OTHER PUBLICATIONS

Adam, Norbert, et al. "Polyurethanes", Ullmann's Encyclopedia of Industrial Chemistry Release 2005, Electronic Release, 7th ed., chap. 7 ("Foams"), 2012, Wiley-VCH Verlag GmbH & Co KGaA, Weinheim, pp. 545-546 and 567-587.
Oertel, Guenter, "Polyurethane", Kunststoff-Handbuch, vol. VII, Carl Hanser Verlag, Munich, 1993, pp. 104-123.
Konig A., et al. "Methyl-DOPO—a new flame retardant for flexible polyurethane foam", Polym. Adv. Technol 2011, John Wiley & Sons, Ltd., pp. 5-13.
Boden, et al., "Verfahrenstectanik der PUR-Herstellung", Kunststoff-Handbuch vol. VII, Polyurethanes, edited by G. Oertel, Carl Hanser Verlag Munich, Vienna 1993, pp. 139-192.
European Search Report from European Application No. 15177508, dated Dec. 11, 2015, two pages.

* cited by examiner

Primary Examiner — John Cooney

(57) ABSTRACT

Low-scorch flame-retardant polyurethane foams include phosphorus-containing propionic ester flame retardants. Methods for producing and using the foams are also provided.

19 Claims, No Drawings

LOW-SCORCH FLAME-RETARDANT POLYURETHANE FOAMS

BACKGROUND INFORMATION

Polyurethane foams are used in many sectors, such as furniture, mattresses, transport, building and industrial insulation. To meet the high levels of flame resistance required of materials to be used inter alia for the automotive, rail or aircraft interior and also in building insulation, polyurethane foams generally have to be enhanced with flame retardants. A multiplicity of different flame retardants are already known and commercially available for this. However, there are often appreciable technical issues and/or toxicological concerns surrounding their use.

When, for instance, solid flame retardants are used, e.g. melamine, ammonium polyphosphate or ammonium sulphate, sedimentation or aggregation gives rise to metering problems which often necessitate technical modifications to the foaming equipment, i.e. inconvenient revamping and rejigging.

Commonly used chloroalkyl phosphates tris(chloroethyl) phosphate, tris(chloroisopropyl) phosphate and tris(dichloroisopropyl) phosphate are readily meterable liquids. However, a recent but increasingly common requirement of open-cell flexible polyurethane foam systems for the automotive interior is that the gaseous emissions (volatile organic compounds, VOCs) and especially the condensable emissions (fogging) from these foams shall not exceed low limits. The liquids referred to above no longer meet these requirements owing to their excessive volatility.

Fogging refers to the undesired condensation of evolved volatile constituents from the motor vehicle interior on glass panes, in particular on the windscreen. This phenomenon is quantifiable according to DIN 75 201 B. The automotive industry typically requires that the fogging condensate as determined by the DIN 75201 B method shall be less than 1 mg.

Furthermore, halogen-free flame retardants are preferred from ecotoxicological aspects and also by reason of ameliorated fire side-effects regarding smoke gas density and smoke gas toxicity. Halogen-free flame retardants may also be of particular interest for performance reasons. For instance, severe corrosion is observed on the plant components used for flame lamination of polyurethane foams when halogenated flame retardants are used. This is attributable to the emissions of hydrohalic acid which arise during the flame lamination of halogen-containing polyurethane foams.

Flame lamination refers to a process for bonding textiles and foams together wherein one side of a foam sheet is incipiently melted by means of a flame and immediately thereafter pressed together with a textile web.

The automotive and furniture industries are increasingly demanding the use of flame retardants which, especially in open-cell flexible polyurethane foams, cause a very low level of scorch. Scorch, or core discolouration, refers to the undesirable browning in polyurethane foams during manufacture, caused by thermal and oxidative degradation of the polyurethane foam in the presence of air. Core discolouration is observed in particular in the industrial manufacture of large polyurethane foam buns, since this is where the unfavourable surface/volume ratio means that the temperature in the core of the bun remains at an elevated level for longer. On the laboratory scale, core discolouration is quantifiable by the microwave method described in U.S. Pat. No. 4,131,660.

Flame retardants can have an appreciable adverse effect on the core discolouration of polyurethane foams. An addition of chloroalkyl phosphates, for example tris(dichloroisopropyl) phosphate, as flame retardant leads to an appreciable increase in core discolouration, or scorch. Brominated diphenyl ethers, dialkyl tetrabromophthalates and aryl phosphates are low-scorch flame retardants. Aryl phosphates are the flame retardants of choice to provide the combination of low scorch and freedom from halogen.

Aryl phosphates such as triphenyl phosphate (cf. for instance EP 0 170 206 A1) or diphenyl cresyl phosphate (cf. for instance EP 0 308 733 B1) are readily available and make for efficacious flame retardants when used in polyurethane foams. However, triphenyl phosphate has the serious disadvantage of being harmful for aquatic organisms. This applies not just to triphenyl phosphate itself, but also to many commercialized aryl phosphate mixtures with triphenyl phosphate.

A further problem is that the conditions of polyurethane synthesis or the further product lifecycle of the foam may result in a minimal release of phenols. Aryl phosphates are therefore counted among the so-called phenol-formers. Phenol-formers are capable of causing a measurable content of substituted or unsubstituted phenols in a product even when the phenols in question were themselves not even used in the manufacture of the product. Examples of phenol-formers are the phenyl and alkylphenyl esters of organic and inorganic acids. Since the presence of phenol-formers in consumer applications, for example in the automotive sector, is frequently no longer accepted for reasons of product safety, there is a need for equivalent replacements.

Rising expectations of product safety are therefore driving the search for alternatives to triphenyl phosphate-containing flame retardants in polyurethane foams.

SUMMARY

It is an object of the present invention to provide a flame-retardant polyurethane foam that overcomes the disadvantages of known flame-retardant polyurethane foams.

It was found that flame-retardant polyurethane foams are obtainable by using certain, phosphorus-containing propionic esters.

It was surprisingly found that polyurethane foams obtainable in this way—without the use of halogen-containing flame retardants or phenol-formers—have excellent flame resistance properties, similar to those of the familiar aryl phosphates, and are also notable for low fogging and low scorch or core discolouration.

The invention provides a flame-retardant polyurethane foam, characterized in that by way of flame retardation it contains at least one phosphorus-containing propionic ester of formula (I)

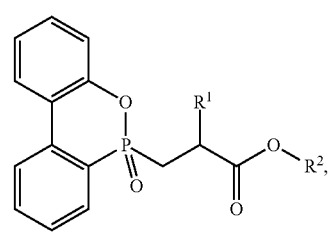

(I)

where
R$^1$ represents hydrogen or a straight-chain or branched alkyl moiety of 1 to 4 carbon atoms, and
R$^2$ represents a straight-chain or branched alkyl moiety of 1 to 10 carbon atoms or a cycloalkyl moiety of 3 to 10 carbon atoms.

DESCRIPTION OF THE EMBODIMENTS

Preferably, R$^1$ represents hydrogen and R$^2$ represents a straight-chain or branched alkyl moiety of 1 to 4 carbon atoms or a cycloalkyl moiety of 5 to 6 carbon atoms.

More preferably, R$^1$ represents hydrogen and R$^2$ represents ethyl or n-butyl.

A straight-chain or branched alkyl moiety of 1 to 4 carbon atoms in the meaning of R$^1$ is, for example, a methyl, ethyl, propyl or butyl moiety, including all possible isomers of the recited moieties.

A straight-chain or branched alkyl moiety of 1 to 10 carbon atoms in the meaning of R$^2$ is, for example, a methyl, ethyl, propyl, butyl, pentyl, hexyl, heptyl, octyl, nonyl or decyl moiety, including all possible isomers of the recited moieties.

A cycloalkyl moiety of 3 to 10 carbon atoms in the meaning of R$^2$ is, for example, a cyclopropyl, cyclobutyl, cyclopentyl or cyclohexyl moiety.

The flame-retardant polyurethane foam of the present invention may contain one, or more than one propionic ester of formula (I) in any desired mixture.

The content of phosphorus-containing propionic esters of formula (I) in the flame-retardant polyurethane foam may be about 0.1 wt % to about 25 wt % based on the entire foam. The foam preferably contains about 1.0 to about 16 wt % of phosphorus-containing propionic esters of formula (I) based on 100 wt % of foam.

The phosphorus-containing propionic esters of formula (I) in the foam of the present invention are preferably liquids at the processing temperature. Processing temperature here refers to the temperature at which the polyurethane raw materials are fed to the metering and mixing assemblies of the foaming equipment. In general, temperatures of about 20° C. to about 80° C. may be selected according to the viscosities of the components and the design of the metering assemblies.

Preferably, the phosphorus-containing propionic esters of formula (I) have a viscosity of about 10 mPas to about 10 000 mPas at 23° C.

The phosphorus-containing propionic esters of formula (I) in the polyurethane foams and their methods of making are known, for example from DE 26 46 218 A1.

The phosphorus-containing propionic esters of formula (I) are obtainable, for example, by reacting 9,10-dihydro-9-oxa-10-phosphaphenanthrene 10-oxide with acrylic esters at a temperature of about 35 to about 65° C. and atmospheric pressure.

The starting materials 9,10-dihydro-9-oxa-10-phosphaphenanthrene 10-oxide and acrylic esters are commercially available.

The polyurethane foam is an isocyanate-based foam comprising predominantly urethane and/or isocyanurate and/or allophanate and/or uretdione and/or urea and/or carbodiimide groups. The preparation of isocyanate-based foams is described in, for example, DE-A 16 94 142 (=GB 1 211 405), DE-A 16 94 215 (=U.S. Pat. No. 3,580,890) and DE-A 17 20 768 (=U.S. Pat. No. 3,620,986).

Polyurethane foams are broadly divided into flexible and rigid foams. Although flexible and rigid foams can in principle have roughly the same envelope density and composition, flexible polyurethane foams are only minimally crosslinked and offer but minimal resistance to deformation by compressive stress. In contradistinction thereto, the structure of rigid polyurethane foams consists of highly crosslinked units and the deformation resistance of the rigid polyurethane foam under compressive stress is very high. The typical rigid polyurethane foam is closed-cell and has but a low thermal conductivity. It is primarily in the synthesis of polyurethanes, which proceeds via the reaction of polyols with isocyanates, that the later structure of the foam and its properties are influenced via the structure and molar mass of the polyol and also via the reactivity and number (functionality) of the hydroxyl groups present in the polyol. Further details regarding rigid and flexible foams, useful starting materials for their production and also processes for their production are found in Norbert Adam, Geza Avar, Herbert Blankenheim, Wolfgang Friederichs, Manfred Giersig, Eckehard Weigand, Michael Hoffmann, Friedrich-Wilhelm Wittbecker, Donald-Richard Larimer, Udo Maier, Sven Meyer-Ahrens, Karl-Ludwig Noble and Hans-Georg Wussow: "Polyurethanes", Ullmann's Encyclopedia of Industrial Chemistry Release 2005, Electronic Release, 7th ed., chap. 7 ("Foams"), Wiley-VCH, Weinheim 2005.

The polyurethane foam of the present invention preferably has an envelope density of about 10 kg/m$^3$ to about 130 kg/m$^3$. It more preferably has an envelope density of about 15 kg/m$^3$ to about 40 kg/m$^3$.

The polyurethane foams of the present invention preferably do not contain any halogen-containing flame retardants. The polyurethane foams of the present invention preferably do not contain any flame retardant comprising aryl phosphate.

The polyurethane foams of the present invention are notable for low scorch, or core discolouration. The abovementioned microwave method of U.S. Pat. No. 4,131,660, where a foam sample is heated by microwave irradiation and then the resultant colouration is determined colorimetrically, is available for comparative purposes. The colour difference dE from a pure white reference is deemed to provide a measure of the core discolouration to be expected under manufacturing conditions. In the polyurethane foams of the present invention, the increase in core discolouration, expressed as colour difference dE pursuant to the microwave method, is preferably not more than about 50% based on the dE of a corresponding foam that does not contain any flame retardants of the present invention.

The present invention further provides for the use of at least one phosphorus-containing propionic ester of formula (I), having the above-indicated general and preferred meaning, in the manufacture of flame-retardant polyurethane foam.

Surprisingly, the phosphorus-containing propionic esters of formula (I) are usable not only in the manufacture of polyether-based foams but also in the manufacture of polyester-based foams.

The phosphorus-containing propionic esters of formula (I) are liquid at the processing temperatures of polyurethane raw materials, which makes them easy to handle and process.

The present invention further provides a process for producing a low-scorch flame-retardant polyurethane foam by reacting at least one organic polyisocyanate component (i) containing at least two isocyanate groups with at least one polyol component (ii) containing at least two isocyanate-reactive hydrogen atoms, optionally in the presence of customary blowing agents, stabilizers, activators and/or further customary auxiliary and added-substance materials at a temperature of about 20° C. to about 80° C., characterized in that the flame retardation used comprises at least one phosphorus-containing propionic ester of formula (I), having the above-indicated general and preferred meaning, in an amount of about 0.1 parts to about 50 parts based on 100 parts of polyol component (ii).

The polyurethane foam of the present invention is an isocyanate-based foam comprising predominantly urethane and/or isocyanurate and/or allophanate and/or uretdione and/or urea and/or carbodiimide groups. The preparation of isocyanate-based foams is known per se and is described in, for example, DE-A 16 94 142 (=GB 1 211 405), DE-A 16 94 215 (=U.S. Pat. No. 3,580,890) and DE-A 17 20 768 (=U.S. Pat. No. 3,620,986).

The isocyanate-based PU foams of the present invention are generally produced using the following starting components:

1. Organic polyisocyanate components (i) from the series of aliphatic, cycloaliphatic, araliphatic, aromatic and heterocyclic polyisocyanates (cf. for instance DE-A 27 32 292), for example those of the formula Q(NCO)n, where n is from 2 to 4, preferably from 2 to 3, and Q is an aliphatic hydrocarbyl moiety of about 2 to about 18, preferably 6 to 10 carbon atoms, a cycloaliphatic hydrocarbyl moiety of about 4 to about 15, preferably 5 to 10 carbon atoms, an aromatic hydrocarbyl moiety of about 6 to about 15, preferably 6 to 13 carbon atoms or an araliphatic hydrocarbyl moiety of about 8 to about 15, preferably 8 to 13 carbon atoms. Particular preference is given in general to the industrially readily accessible polyisocyanates derived from 2,4- and/or 2,6-tolylene diisocyanate and/or from 4,4'- and/or 2,4'-diphenylmethane diisocyanate.
2. Polyol components (ii) containing at least two isocyanate-reactive hydrogen atoms and having a molecular weight of about 400 g/mol to about 8000 g/mol. This is to be understood as meaning not only amino-, thio- or carboxyl-containing compounds but preferably hydroxyl-containing compounds (polyols), in particular polyols having from about 2 to about 8 hydroxyl groups. If the polyurethane foam is to be a flexible foam, it is preferable to use polyols having molar masses of about 2000 g/mol to about 8000 g/mol and about 2 to about 6 hydroxyl groups per molecule. If, by contrast, a rigid foam is to be produced, it is preferable to use highly branched polyols having molar masses of about 400 g/mol to about 1000 g/mol and about 2 to about 8 hydroxyl groups per molecule. The polyols are in particular polyethers and polyesters and also polycarbonates and polyester amides of the type known for the production of homogeneous and of cellular polyurethanes and as described for instance in DE-A 28 32 253 (=U.S. Pat. No. 4,263,408) and in EP 1 555 275 A2 (=US 2005 159 500). The polyesters and polyethers having two or more hydroxyl groups are preferable for the purposes of the present invention.
3. Optionally extenders and/or crosslinkers. These are compounds having two or more isocyanate-reactive hydrogen atoms and a molecular weight of about 32 to about 399. This is also to be understood as comprehending hydroxyl- and/or amino- and/or thio- and/or carboxyl-containing compounds, preferably hydroxyl- and/or amino-containing compounds. These compounds generally have from about 2 to about 8, preferably from about 2 to about 4 isocyanate-reactive hydrogen atoms. Examples thereof are likewise described in DE-A 28 32 253 (=U.S. Pat. No. 4,263,408).
4. Water and/or volatile substances as blowing agents, e.g. n-pentane, i-pentane, cyclopentane, halogen-containing alkanes, such as trichloromethane, methylene chloride or chlorofluoroalkanes, gases, such as $CO_2$ and others. A mixture of two or more blowing agents can also be used.
5. It is optional to use auxiliary and additive agents, such as catalysts of the type known per se, surfactant additives, such as emulsifiers and foam stabilizers, reaction retarders, e.g. acidic chemistries such as hydrochloric acid or organic acyl halides, further cell regulators of the type known per se, such as paraffins or fatty alcohols and dimethylpolysiloxanes and also pigments or dyes and further flame retardants, also stabilizers against ageing and weathering effects, scorch inhibitors, plasticizers, fungistatic and bacteriostatic substances and also fillers, such as barium sulphate, diatomaceous earth, carbon black or whiting (DE-A 27 32 292=U.S. Pat. No. 4,248, 930). As scorch inhibitors there may be present in particular sterically hindered trialkylphenols, alkyl esters of 3-(3,5-di-tert-butyl-4-hydroxyphenyl)propionic acid, benzofuran-2-ones, secondary aromatic amines, phosphites, phenothiazines or tocopherols. Details about the use and performance of these auxiliary and additive agents are found in Kunststoff-Handbuch, volume VII, Carl Hanser Verlag, Munich, 1993, at pages 104 to 123.

Additional flame retardants alongside the phosphorus-containing propionic esters of formula (I) may optionally be included in the polyurethane foam. The additional flame retardants may include, one or more of the following compounds:

a) organophosphorus compounds, for example triethyl phosphate, aliphatic bisphosphates, dimethyl methanephosphonate, diethyl ethanephosphonate, dimethyl propanephosphonate, oligomeric phosphates or phosphonates, hydroxyl-containing phosphorus compounds, 5,5-dimethyl-1,3,2-dioxaphosphorinane 2-oxide derivatives, 6H-dibenz[c,e][1,2]oxaphosphorine 6-oxide derivatives, e.g. $N^1,N^2$-bis(6-oxido-6H-dibenz[c,e][1,2]oxaphosphorin-6-yl)-1,2-ethanediamine,
b) salt-type phosphorus compounds, for example ammonium phosphate, ammonium polyphosphate, melamine phosphate, melamine polyphosphate, metal melamine polyphosphates, metal salts of dialkylphosphinic acids, metal salts of alkanephosphonic acids,
c) nitrogen compounds, for example melamine and melamine cyanurate, and
d) inorganic flame retardants, for example aluminium hydroxide, boehmite, magnesium hydroxide, expandable graphite or clay minerals.

The polyurethane foams of the present invention can thus be made as rigid or flexible foams by choosing the starting materials, in particular the polyol component (ii), in the appropriate manner. The polyurethane foams of the present invention are preferably flexible foams.

The above-described reaction components, excluding the isocyanates, but including the flame retardants, may be premixed, and then the pre-mixed components may be reacted with the isocyanates by a one-step process, a prepolymer process or a semiprepolymer process. This is often done using mechanical means, for example those described in U.S. Pat. No. 2,764,565. Details of processing devices also suitable for the purposes of the present invention are found in Kunststoff-Handbuch volume VII, Polyurethanes, edited by G. Oertel, Carl Hanser Verlag Munich, Vienna 1993, at pages 139 to 192.

Cold-curing foams are also obtainable according to the present invention (for example as described in GB patent 11

62 517, DE-A 21 53 086). However, it will be appreciated that foams are also obtainable by bun foaming or by the double conveyor belt process. Polyisocyanurate foams are produced according to the known methods and conditions for this.

The process of the present invention allows the production of flame-retardant polyurethane foams as rigid or flexible foams in continuous or batch operation or as foamed mouldings. The process of the present invention is preferable in the manufacture of flexible foams produced by a bunstock foaming process.

The foamed mouldings obtainable according to the invention have, for example, the following application: furniture cushioning, textile inserts, mattresses, seats, preferably aircraft seats or automotive seats, arm rests, modules, vehicle interior components and seat and instrument panel trim.

The examples which follow describe the invention more specifically without any intention to narrow the invention.

EXAMPLES

Preparing a Phosphorus-containing Propionic Ester of Formula (I)

n-Butyl 6-oxo-6H-dibenz[c,e][1,2]oxaphosphorine-6-propionate (flame retardant F3) was prepared as described in Organic Letters 2005, Vol. 7, No. 5, (Supplementary Information S8) by reaction of 6H-dibenz[c,e][1,2]oxaphosphorine 6-oxide with n-butyl acrylate. A colourless liquid having a viscosity of 6500 mPas at 23° C. was obtained.

Production of Flexible Polyurethane Foams

Parts are by weight.

Quantification of Flame Retardancy

The flexible polyurethane foams were tested in accordance with the Federal Motor Vehicle Safety Standard FMVSS-302 ("MVSS 302 test"). In this test, foam specimens measuring 210 mm×95 mm×15 mm (L×W×H) secured in a horizontal holder were ignited in the centre of the short edge for 15 seconds with a gas burner flame 40 mm its height, the igniting flame was removed and the flame front progression was observed. Depending on whether and, if so, how far the specimen continued to burn, it was assigned to the fire classes SE (self-extinguishing, less than 38 mm of the sample burned), SE/NBR (self-extinguishing within 60 seconds/no burn rate), SE/B (self-extinguishing/burn rate measurable), BR (burns to the sample end, burn rate measurable) and RB (fast-burning, burn rate not measurable). To pass the test, at least one BR classification is required. The burn tests were carried out five times for each example.

To compare the efficacy of various flame retardants, either it was determined whether the MVSS 302 test was passed with the reported usage of flame retardant (Table 3) or foams comprising different amounts of flame retardant were produced and for each flame retardant the amount required at least for a BR or SE classification was determined in parts by weight per 100 parts by weight of polyol (php) (Table 2 in the rows "BR efficacy" and "SE efficacy") respectively.

Quantification of Fogging

The fogging behaviour of the flexible polyurethane foams was tested in accordance with DIN 75201 B. Cylindrical foam specimens measuring 80 mm×10 mm (Ø×H) were

TABLE 1

Materials used.

| Component | Function | Description |
|---|---|---|
| A1 | polyol | Arcol ® 1105 (Bayer MaterialScience), polyether polyol with OHN 56 mg KOH/g |
| A2 | polyol | Desmophen ® 2200 B (Bayer MaterialScience), polyester polyol with OHN 60 mg KOH/g |
| B | blowing agent | water |
| C1 | catalyst | Addocat ® 108 (Rhein Chemie), 70% solution of bis(2-dimethylaminoethyl) ether in dipropylene glycol |
| C2 | catalyst | Addocat ® SO (Rhein Chemie), tin(II) 2-ethylhexanoate |
| D1 | catalyst | Niax ® A-30 (Momentive), amine |
| D2 | catalyst | Addocat ® 117 (Rhein Chemie), tertiary amine |
| E1 | stabilizer | Tegostab ® B 8232 (Degussa), silicone stabilizer |
| E2 | stabilizer | Tegostab ® B 8324 (Degussa), silicone stabilizer |
| F1 | flame retardant | tris(dichloroisopropyl) phosphate, chloroalkyl phosphate |
| F2 | flame retardant | Disflamoll ® TP LXS 51092, aryl phosphate mixture comprising triphenyl phosphate, commercial product from Lanxess Deutschland GmbH |
| F3 | flame retardant | n-butyl 6-oxo-6H-dibenz[c,e][1,2]oxaphosphorine-6-propionate, phosphorus-containing propionic ester of formula 1 where R1 = H and R2 = n-butyl |
| G1 | diisocyanate | Desmodur ® T 80 (Bayer MaterialScience), tolylene diisocyanate, isomer mixture |
| G2 | diisocyanate | Desmodur ® T 65 (Bayer MaterialScience), tolylene diisocyanate, isomer mixture |

The Table 1 components, with the exception of the diisocyanate (component G), were stirred up into a homogeneous mixture in the mass ratios of Tables 2 to 4, according to foam type. At this point the diisocyanates (component G) were admixed by brief intensive stirring. Following a cream time of 12 seconds to 15 seconds and a rise time of 128 to 166 seconds, flexible polyurethane foams were obtained with the reported envelope densities in kg/m3.

heated to 100° C. for 16 hours and the condensate quantities collected during this time on a piece of aluminium foil cooled to 21° C. and positioned above the specimen were weighed. The condensate quantities measured are reported in Table 2.

Quantification of Core Discolouration

The components were mixed and then poured into a 20×20×14 cm paper mould. 5 minutes after completion of the foaming process (the temperature in the core of the foam reaches about 135° C.), the foam was irradiated in a microwave oven (Mars 5, CEM) at 300 watts for 4 minutes.

Thereafter, the foam was removed (temperature in the foam about 160° C.) and left to cool overnight. The foam was subsequently halved and examined for scorch. For this, the foam was analysed with a colorimeter (CR-400/410, Konica Minolta). The colorimeter quantifies the three colorimetric characteristics lightness (L), red and green hue (a) and yellow and blue hue (b) of the foam under investigation. The differences dL, da and db from a pure white reference were determined. These data were then used to compute the colour difference (dE) of the investigated foam versus the reference using the following formula:

$$dE=(dL^2+da^2+db^2)^{0.5}.$$

The increase Z in the core discolouration of a flame-retardant foam is a measure of the effect on the core discolouration by the flame retardant and corresponds to the formula $$Z=[dE(\text{with})-dE(\text{without})]/dE(\text{without})\cdot 100\%$$

(dE(with)=colour difference of foam with flame retardant, dE(without)=colour difference of foam without flame retardant).

Production of Polyether Flexible Foams (Automotive)

TABLE 2

Composition (parts) and test results of Inventive Example B1 and of non-inventive Comparative Examples V1 to V3.

| | Example | | | |
|---|---|---|---|---|
| | V1 | V2 | V3 | B1 |
| A1 | 100 | 100 | 100 | 100 |
| B | 3.0 | 3.0 | 3.0 | 3.0 |
| C1 | 0.08 | 0.08 | 0.08 | 0.08 |
| C2 | 0.16 | 0.16 | 0.16 | 0.16 |
| E1 | 0.80 | 0.80 | 0.80 | 0.80 |
| F1 | | 6 | | |
| F2 | | | 6 | |
| F3 | | | | 6 |
| G1 | 40.9 | 40.9 | 40.9 | 40.9 |
| envelope densiy [kg/m³] | 32.5 | 33.3 | 33.5 | 33.2 |
| fogging [mg] | 0.3 | 0.6 | 0.8 | 0.3 |
| BR efficacy [php] | n.a. | 4 | 9 | 8 |
| SE efficacy [php] | n.a. | 5 | 10 | 10 |

Results

In the absence of a flame retardant (Comparative Example V1, Table 2) the flexible polyurethane foam burns away rapidly and so does not pass the MVSS 302 test. But it does exhibit a very low fogging value. A foam with tris(dichloroisopropyl) phosphate (Comparative Example V2) is flame resistant and passes the MVSS 302 test at a usage level of 4 php. However, the foam exhibits increased fogging, albeit at a level where the 1 mg condensate max fogging value stipulated by the automotive industry is complied with. Tris(dichloroisopropyl) phosphate, however, carries with it the above-described disadvantages of a halogen-containing flame retardant. This problem is circumvented by using the halogen-free aryl phosphate Disflamoll® TP LXS 51092 (Comparative Example V3), yet the fogging value is relatively high. Moreover, Disflamoll® TP LXS 51092 contains phenol-formers, which is undesirable.

Example B1 shows that the flexible polyurethane foam of the present invention is flame resistant as per the MVSS 302 test and has a very low fogging value without this requiring halogen-containing flame retardants or phenol-formers.

Production of Polyester Flexible Foams

TABLE 3

Composition (parts) and test results of Inventive Example B2 and of non-inventive Comparative Examples V4 to V6.

| | Example | | | |
|---|---|---|---|---|
| | V4 | V5 | V6 | B2 |
| A2 | 100 | 100 | 100 | 100 |
| B | 4.5 | 4.5 | 4.5 | 4.5 |
| D1 | 0.25 | 0.25 | 0.25 | 0.25 |
| D2 | 0.25 | 0.25 | 0.25 | 0.25 |
| E2 | 1.0 | 1.0 | 1.0 | 1.0 |
| F1 | | 6 | | |
| F2 | | | 6 | |
| F3 | | | | 6 |
| G1 | 24.1 | 24.1 | 24.1 | 24.1 |
| G2 | 24.1 | 24.1 | 24.1 | 24.1 |
| envelope density [kg/m³] | 31.8 | 33.7 | 31.9 | 32.5 |
| MVSS 302 assessment | fail | pass | pass | pass |

Results

In the absence of a flame retardant (Comparative Example V4, Table 3) the flexible polyurethane foam burns away rapidly and so does not pass the MVSS 302 test. All the foams with a flame retardant pass MVSS 302 on admixture of 6 parts.

Example B2 shows that the flexible polyurethane foam of the present invention meets the flame retardancy requirements of the MVSS 302 test like the comparative examples.

Production of Polyether Flexible Foams (Furniture)

TABLE 4

Composition (parts) and test results of Inventive Example B3 and of non-inventive Comparative Examples V7 to V9.

| | Example | | | |
|---|---|---|---|---|
| | V7 | V8 | V9 | B3 |
| A1 | 100 | 100 | 100 | 100 |
| B | 4.5 | 4.5 | 4.5 | 4.5 |
| C1 | 0.12 | 0.12 | 0.12 | 0.12 |
| C2 | 0.20 | 0.20 | 0.20 | 0.20 |
| E1 | 0.8 | 0.8 | 0.8 | 0.8 |
| F1 | | 18 | | |
| F2 | | | 18 | |
| F3 | | | | 18 |
| G1 | 57.3 | 57.3 | 57.3 | 57.3 |
| envelope density [kg/m³] | 24.7 | 25.8 | 26.4 | 25.7? |
| core discolouration [dE] | 12 | 23.5 | 16.5 | 15 |
| core discolouration increase [Z] | 0% | 96% | 38% | 25% |

Results

In the absence of a flame retardant (Comparative Example V7, Table 4) only minimal core discolouration occurs. On admixing the flame retardant tris(dichloroisopropyl) phosphate, the foam exhibits a severely increased level of core discolouration (Comparative Example V8). Comparative Example V 9 and also the flexible polyurethane foam of the present invention (Example B 3), by contrast, exhibit but a minimal increase in core discolouration versus the foam without flame retardant.

The proffered examples demonstrate that the foams of the present invention are rendered flame resistant by use of simple-to-process, liquid phosphorus-containing propionic esters of formula I. These flame retardants are readily processable not only with polyether polyols but also with polyester polyols (Tables 2, 3 and 4). Their efficacy in polyurethane foams corresponds to that of aryl phosphates (Tables 2 and 3). There is no need to use halogen-containing flame retardants or phenol-formers. The foams are notable for low fogging values (Table 2) and low scorch (Table 4).

What is claimed is:

1. A flame-retardant polyurethane foam comprising at least one phosphorus-containing propionic ester of formula (I)

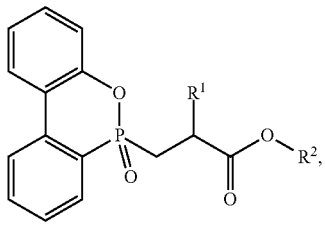

where:
R$^1$ is hydrogen, or a straight-chain or branched alkyl moiety of 1 to 4 carbon atoms; and
R$^2$ is a straight-chain or branched alkyl moiety of 1 to 10 carbon atoms, or a cycloalkyl moiety of 3 to 10 carbon atoms.

2. The foam of claim 1, wherein:
R$^1$ is hydrogen; and
R$^2$ is a straight-chain or branched alkyl moiety of 1 to 4 carbon atoms, or a cycloalkyl moiety of 5 to 6 carbon atoms.

3. The foam of claim 1, wherein:
R$^1$ is hydrogen; and
R$^2$ is ethyl or n-butyl.

4. The foam of claim 1, wherein an amount of the at least one phosphorus-containing propionic ester of formula (I) in the foam is about 0.1 wt % to about 25 wt %, based on 100 wt % of polyurethane foam.

5. The foam of claim 1, wherein an amount of the at least one phosphorus-containing propionic ester of formula (I) in the foam is about 1.0 to about 16 wt % based on 100 wt % of polyurethane foam.

6. The foam of claim 1, wherein the phosphorus-containing propionic ester of formula (I) is a compound which is liquid at temperatures of about 20° C. to about 80° C.

7. The foam of claim 1, wherein the phosphorus-containing propionic ester of formula (I) has a viscosity of about 10 mPas to about 10,000 mPas at 23° C.

8. The foam of claim 1, wherein the foam is a flexible polyurethane foam.

9. The foam of claim 1, further comprising one or more additional flame retardants other than the propionic esters of formula (I).

10. The foam of claim 1, wherein the foam does not contain any flame retardant comprising aryl phosphate.

11. The foam of claim 1, wherein:
the foam is a flexible polyurethane foam additionally comprising at least one organic polyisocyanate component having at least two isocyanate groups and at least one polyol component having at least two isocyanate-reactive hydrogen atoms;
R$^1$ is hydrogen;
R$^2$ is ethyl or n-butyl; and
an amount of the at least one phosphorus-containing propionic ester of formula (I) in the foam is about 1.0 to about 16 wt % based on 100 wt % of polyurethane foam.

12. A method for producing flame-retardant flexible polyurethane foam, the method comprising including at least one phosphorus-containing propionic ester of formula (I)

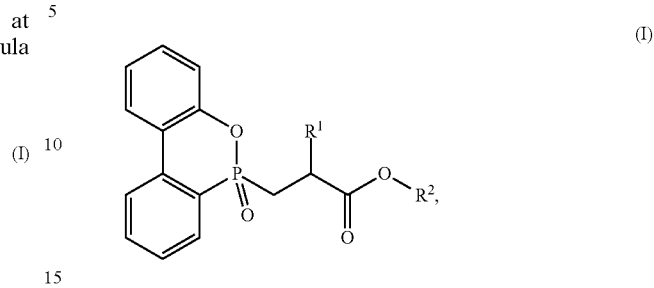

where:
R$^1$ represents hydrogen or a straight-chain or branched alkyl moiety of 1 to 4 carbon atoms, and
R$^2$ represents a straight-chain or branched alkyl moiety of 1 to 10 carbon atoms or a cycloalkyl moiety of 3 to 10 carbon atoms,
into the foam as a flame retardant during production of the foam.

13. The method of claim 12, further comprising reacting at least one organic polyisocyanate component having at least two isocyanate groups with at least one polyol component having at least two isocyanate-reactive hydrogen atoms, at a temperature of about 20° C. to 80° C., in the presence of the at least one phosphorus-containing propionic ester of formula (I).

14. The method of claim 13, further comprising:
premixing the at least one phosphorus-containing propionic ester of formula (I) with the at least one polyol to form a mixture; and
adding the at least one organic polyisocyanate to the mixture to react the at least one organic polyisocyanate with the at least one polyol.

15. The method of claim 14, further comprising premixing at least one of: blowing agents, stabilizers, activators, and further auxiliary and added-substances, into the mixture prior to adding the at least one organic polyisocyanate.

16. The method of claim 12, wherein an amount of propionic ester of formula (I) in the foam is about 0.1 to about 50 parts based on 100 parts of the polyol component.

17. A process for reducing at least one of core discolouration, scorch, and fogging in or from flame-retardant polyurethane foam, the process comprising including at least one phosphorus-containing propionic ester of formula (I)

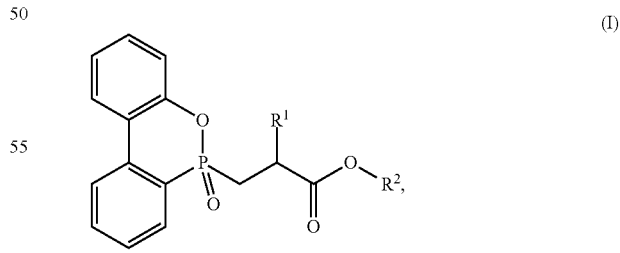

where:
R$^1$ represents hydrogen or a straight-chain or branched alkyl moiety of 1 to 4 carbon atoms, and
R$^2$ represents a straight-chain or branched alkyl moiety of 1 to 10 carbon atoms or a cycloalkyl moiety of 3 to 10 carbon atoms,
into the foam during manufacture of the foam.

18. The process according to claim 17, wherein the process is a process for reducing the core discolouration in flame-retardant polyurethane foam.

19. A foamed moulding for at least one of furniture cushioning, textile inserts, mattresses, seats, arm rests, modules, vehicle interior components, and seat and instrument panel trim, the moulding comprising the flame-retardant polyurethane foam of claim 1.

* * * * *